United States Patent [19]

Ishizaka et al.

[11] Patent Number: 4,592,000

[45] Date of Patent: May 27, 1986

[54] ELECTRONIC CLINICAL THERMOMETER, AND METHOD OF MEASURING BODY TEMPERATURE

[75] Inventors: Hideo Ishizaka; Tadashi Fujii, both of Fujinomiya, Japan

[73] Assignee: Terumo Corporation, Tokyo, Japan

[21] Appl. No.: 504,235

[22] Filed: Jun. 14, 1983

[30] Foreign Application Priority Data

Jun. 24, 1982 [JP] Japan .................. 57-108895
Jun. 24, 1982 [JP] Japan .................. 57-108896

[51] Int. Cl.⁴ ............................................ G01K 7/24
[52] U.S. Cl. ................................ 364/557; 364/571; 374/102; 374/170
[58] Field of Search ............... 374/102, 103, 107, 183, 374/170, 171, 134, 169, 120; 364/557, 900, 551, 169, 170, 571; 73/432 CT, 362

[56] References Cited

U.S. PATENT DOCUMENTS

| | | | |
|---|---|---|---|
| 3,702,076 | 11/1972 | Georgi .................................. | 73/362 |
| 3,872,726 | 3/1975 | Kauffeld et al. ..................... | 374/169 |
| 3,877,307 | 4/1975 | Georgi ................................. | 73/432 CR |
| 4,092,863 | 6/1978 | Turner ................................. | 374/169 |
| 4,481,596 | 11/1984 | Townzen ............................. | 374/169 |

FOREIGN PATENT DOCUMENTS 0039460 11/1981 European Pat. Off. .
1421981 1/1976 United Kingdom .
1493896 11/1977 United Kingdom .
2084329 4/1982 United Kingdom .

OTHER PUBLICATIONS

"Fitting of Measured Data to a Known Relationship", Electronics Letters, vol. 9, No. 819, May, 1973, B. Bramer, et al., Great Britain, pp. 184–186.

Primary Examiner—Errol A. Krass
Attorney, Agent, or Firm—Frishauf, Holtz, Goodman & Woodward

[57] ABSTRACT

An electronic clinical thermometer having a store of plural temperature prediction functions in which elapsed measurement time is a variable, each function prescribing a temperature change up to a final, stable temperature. Temperature at a specific point in time is predicted in accordance with a selected temperature prediction function based on a temperature at a specific sampling instant and elapsed measurement time up to the past sampling instant. The predicted value and a value actually measured at the specific point in time are compared to obtain a difference between them. When the difference falls outside prescribed limits, another temperature prediction function is selected, a subsequent predicted value is obtained based thereon, and the foregoing process is repeated until a difference is found which lies within the prescribed limits. When this occurs, a predicted value of the final, stable temperature corresponding to the prediction function is obtained and delivered as an output.

14 Claims, 12 Drawing Figures

ELECTRONIC CLINICAL THERMOMETER, AND METHOD OF MEASURING BODY TEMPERATURE

BACKGROUND OF THE INVENTION

1. Field of the Invention

This invention relates to an electronic clinical thermometer and, more particuarly, to an electronic clinical thermometer which includes means for sensing the temperature of a portion of the human body, arithmetic means for predicting, based on the sensed body temperature, the final temperature at which the thermometer will stabilize, and means for displaying temperature. The invention further relates to a method of measuring body temperature.

2. Description of the Prior Art

In the prior art arrangement, the temperature which will prevail upon thermal stabilization of the electronic clinical thermometer is predicted from measured temperature and is displayed before thermal stabilization is attained. Typically, prediction of temperature is performed by monitoring, over a period of time, the measured temperature as well as the rate of change thereof with time, and employing these two variables along with a function for predicting temperature in which the variable is the elapsed time up to the moment of observation. The predicted final, stable temperature is uniquely defined by the actual values of these three variables.

With an electronic clinical thermometer that operates by predicting the final, stable temperature, measurement of temperature is completed before thermal stabilization is attained, thereby reducing the time required for measurement. However, a disadvantage with such a thermometer is that the accuracy with which temperature is predicted declines markedly unless a proper temperature prediction function is chosen. Further, it is desired that a final temperature, reached upon stabilization, be computed with greater accuracy by continuing measurement, even after a final temperature has been predicted and displayed, rather than suspending measurement and anticipatory computations at such time.

SUMMARY OF THE INVENTION

Accordingly, an object of the present invention is to provide an electronic clinical thermometer, and a method of measuring body temperature, for predicting a final, stable temperature with great accuracy.

Another object of the present invention is to provide an electronic clinical thermometer, and a method of measuring body temperature, for improving the accuracy of temperature prediction statistically with the passage of measurement time.

According to the present invention, the foregoing objects are attained by providing an electronic clinical thermometer comprising temperature sensing means for sensing body temperature at a prescribed part of a body, arithmetic means for predicting a final, stable temperature based on the sensed body temperature, the arithmetic means storing a plurality of temperature prediction functions in which elapsed measurement time is a variable, each function defining a temperature change up to a final, stable temperature, display means for displaying temperature, control means which clocks elapsed measurement time for controlling the temperature sensing means and said arithmetic means at sampling instants, and storage means for temporarily accumulating temperatures sensed by the temperature sensing means at said sampling instants. The arithmetic means is operative for (a) selecting one of the temperature prediction functions, (b) reading the accumulated temperatures out of the storage means, comparing a predicted value of temperature for the present sampling instant with a temperature, sensed by the temperature sensing means, associated with the present sampling instant, and obtaining the difference between the predicted value and the sensed temperature on the basis of the comparison, said predicted value being obtained in accordance with the selected temperature prediction function based on a temperature among said read temperatures which is associated with a past sampling instant and elapsed measurement time up to said past sampling instant, (c) selecting a new temperature prediction function, and returning to (b) at the next sampling instant, when said difference lies outside prescribed limits, and (d) obtaining a predicted value of final, stable temperature corresponding to the selected temperature prediction function, and supplying the obtained value of the final, stable temperature to the display means, when said difference lies within the prescribed limits.

According to an embodiment of the invention, the first temperature prediction function is a function for obtaining a corrective temperature differential representing the difference between temperature sensed by the temperature sensing means and a predicted value of final, stable temperature, the second temperature prediction function is a function for obtaining a temperature increment up to a certain past time, with the temperature sensed by the temperature sensing means serving as a reference. The second temperature prediction function is selected in (a) and (c), the predicted value of temperature at the present sampling instant is obtained in (b) based on a temperature increment found in accordance with the selected second temperature prediction function, and the predicted value of final, stable temperature is obtained in (d) based on a corrective temperature differential found in accordance with a first temperature prediction function corresponding to said selected second temperature prediction function.

According to another embodiment of the invention, $U = \alpha t + \beta + K(t+\gamma)^\delta$ is used as the first temperature prediction function, where:

U: corrective temperature differential
t: elapsed measurement time
K: variable parameter indicating extent of temperature rise
$\alpha, \beta, \gamma, \delta$: constants.

In another embodiment, $U = (aA+b)t + cA + d + K(-t+e)^A + f(t-t_0)/(K+g)$ is used as the first temperature prediction function, where:

U: corrective temperature differential
t: elapsed measurement time
A: variable parameter dependent upon part of body where temperature is being sensed
K: variable parameter indicating extent of temperature rise
a, b, c, d, e, f, g: constants
$t_0$: constant indicating prescribed point in time during course of measurement $(t-t_0)$ being replaced by zero when $t-t_0$ is negative, and by the actual value when $t-t_0$ is non-negative.

Further, the arithmetic means supplies the display means with the obtained predicted value of final, stable temperature when the difference lies within the prescribed limits continously a predetermined length of time, and returns to (b) at the next sampling instant when the difference does not lie in the prescribed limits continuously for the predetermined length of time. The second temperature prediction function selected in (a) is the highest probability of being the proper temperature change, obtained statistically by an actual measurement performed in advance with elapsed measurement time.

In another embodiment, the temperature prediction function selected in (a) is one in which the first temperature prediction function corresponding to the second temperature prediction function approaches a final, stable temperature quickly with elapsed measurement time, and wherein, in (d), second temperature prediction functions corresponding to the first temperature prediction function approaching a final, stable temperature gradually with elapsed measurement time are selected successively.

According to an embodiment, the first and second temperature prediction functions are provided in conformance with measurement conditions for prescribed parts of a body ranging from an armpit to the interior of the mouth, and the second temperature prediction function selected in (a) corresponds to measurement conditions between those for an armpit and those for the interior of the mouth.

The control means instructs the arithmetic means to begin executing (b) through (d) when the temperature sensing means senses a body temperature above a predetermined value and the sensed body temperature exhibits a rate of increase above a predetermined value.

According to another embodiment, the temperature associated with the past sampling instant in (b) is an arithmetic mean value of temperatures sensed at a series of plural past sampling instants, and the temperature, sensed by the temperature sensing means, associated with said present sampling instant is an arithmetic mean value of temperature sensed by the temperature sensing means at the present sampling instant and a temperature sensed by said temperature sensing means at least at one past sampling instant nearest the present sampling instant.

According to another aspect of the present invention, an electronic clinical thermometer comprises temperature sensing means for sensing body temperature at a prescribed part of a body, arithmetic means for predicting a final, stable temperature based on the sensed body temperature, the arithmetic means storing a plurality of temperature prediction functions in which elapsed measurement time is a variable, each function defining a temperature change up to a final, stable temperature, display means for displaying temperature, control means which clocks elapsed measurement time for controlling the temperature sensing means and said arithmetic means at sampling instants, and storage means for temporarily accumulating temperatures sensed by the temperature sensing means at said sampling instants. The arithmetic means is operative for (a) selecting one of the temperature prediction functions, (b) reading the accumulated temperatures out of the storage means, comparing a predicted value of temperature for the present sampling instant with a temperature, sensed by the temperature sensing means, associated with the present sampling instant, and obtaining the difference between the predicted value and the sensed temperature on the basis of the comparison, said predicted value being obtained in accordance with the selected temperature prediction function based on a temperature among said read temperatures which is associated with a past sampling instant and elapsed measurement time up to said past sampling instant, (c) selecting a new temperature prediction function, and returning to (b) at the next sampling instant, when said difference lies outside prescribed limits, and (d) obtaining a predicted value of final, stable temperature corresponding to the selected temperature prediction function, supplying the obtained value of the final, stable temperature to the display means, and returning to (b) at the next sampling instant, when the difference lies within the prescribed limits.

In the foregoing, the arithmetic means supplies the display means with the obtained predicted value of final, stable temperature, and a return is effected to (b) at the next sampling instant, when the difference lies within the prescribed limits continously a predetermined length of time, and effects a return to (b) at the next sampling instant when the difference does not lie in the prescribed limits continuously for the predetermined length of time.

In still another aspect of the present invention, there is provided a method of measuring body temperature including steps of (a) selecting one of a plurality of temperature prediction functions in which elapsed measurement time is a variable, each function prescribing a temperature change up to a final, stable temperature, (b) clocking elapsed measurement time and reading in body temperature at a specific point in time, (c) predicting temperature at a future point in time from the read body temperature and the temperature prediction function at the specific point in time, (d) comparing the predicted temperature and an actually measured temperature at the future point in time for determining a difference between the temperatures, (e) altering the temperature prediction function by selecting another temperature prediction function when the difference falls outside prescribed limits, and executing the steps (c) and (d), and (f) obtaining and outputting an actual value of final, stable temperature corresponding to the selected temperature prediction function when the difference falls within the prescribed limits.

The object of the invention may also be attained by providing a method of measuring body temperature comprising the steps of (a) selecting one of a plurality of temperature prediction functions in which elapsed measurement time is a variable, each function prescribing a temperature change up to a final, stable temperature, (b) clocking elapsed measurement time and reading in body temperature at a specific point in time, (c) predicting temperature at a future point in time from the read body temperature and the temperature prediction function at the specific point in time, (d) comparing the predicted temperature and an actually measured temperature at the future point in time for determining a difference between the temperatures, (e) altering the temperature prediction function by selecting another temperature prediction function when the difference falls outside prescribed limits, and executing the steps (c) and (d), (f) repeating the step (c) a given number of times as time progresses when the difference lies within the prescribed limits, and (g) obtaining and outputting a predicted value of final, stable temperature corresponding to the selected temperature prediction function when each difference between predicted temperature and actually measured temperature at specific points in step (c) lies within the prescribed limits.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENT

Figure 1:
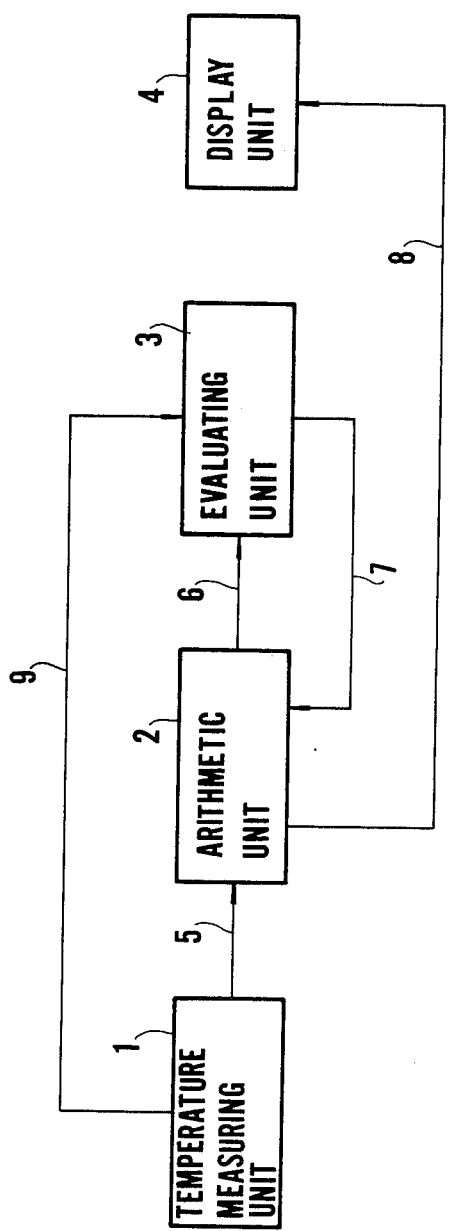
FIG. 1 is a block diagram illustrating the basic construction of an electronic clinical thermometer according to the present invention.

Reference will now be had to the block diagram of FIG. 1 showing the basic construction of an electronic clinical thermometer according to the present invention. The electronic clinical thermometer includes a temperature measuring unit 1, an arithmetic unit 2 for predicting temperature, an evaluating unit 3 and a display unit 4. It will be apparent from the following discussion that the arithmetic unit 2 and evaluating unit 3 are realized by a general-purpose microcomputer, with the temperature measuring unit 1 and display unit 4 serving as the input and output units, respectively.

The temperature measuring unit 1 is constituted by circuitry, having a temperature responsive element 10 (FIG. 5) such as a thermistor, for real-time temperature measurement of a portion of the human body. The arithmetic unit 2 functions to predict present temperature from past data, and final, stable temperature from the present temperature. The evaluating circuit or unit 3 evaluates the temperature predicted for the present time using the present temperature information and, in accordance with the result of the evaluation, alters the value of an arithmetic parameter for predicting temperature and causes the predicted final temperature to be displayed. The display unit 4 presents a visual display of the predicted temperature.

The temperature measuring unit 1 measures body temperature in real time and, at sampling instants, delivers the results of measurement to the arithmetic unit 2 and evaluating unit 3 as real-time temperature signals 5, 9. Upon receiving the real-time temperature signal 5, the arithmetic unit 2 monitors the time which has elapsed from the start of measurement in accordance with measurement start conditions, and stores temperature information related to past elapsed time. Based on the past elapsed time information and past temperature information, the arithmetic unit 2 obtains a temperature increment to predict real-time temperature at the present time and delivers a signal 6, indicative of the real-time predicted temperature, to the evaluating unit 3. To accomplish the foregoing, the arithmetic unit 2 relies upon a prediction function which takes the highest probability of being the proper temperature change, obtained statistically by an actual measurement performed in advance with elapsed measurement time.

The evaluating unit 3 evaluates the real-time predicted temperature signal 6 on the basis of the real-time temperature signal 9. The output of the evaluating unit 3 is a signal 7 applied to the arithmetic unit 2. When the real-time temperature and real-time predicted temperature substantially agree, i.e., when the difference between them falls within predetermined allowable limits, the signal 7 will indicate such agreement and the arithmetic unit 2 will respond by producing a signal 8 indicative of a predicted, final temperature that will be attained when the temperature stabilizes. When there is a lack of substantial agreement between the real-time temperature and real-time predicted temperature, this will be indicated by the signal 7 and the arithmetic unit 2 will instruct a change in the value of a parameter used in the prediction operation.

Upon receiving the signal 7 calling for a change in the value of the parameter, the arithmetic unit 2 changes said value and again predicts real-time temperature at the present time on the basis of the past elapsed time information and past temperature information. The signal 6 indicating the real-time predicted temperature is applied to the evaluating unit 3. These steps are repeated until the real-time temperature and real-time predicted temperature come into agreement. The display unit 4 displays the predicted, final temperature upon receiving the signal 8 giving the value thereof.

In brief, therefore, according to the electronic clinical thermometer of the present invention, temperature at the present time is predicted, using a prediction function defining a temperature change, from a temperature actually measured at a certain past time, and the predicted temperature is compared with temperature actually measured at the present time. When the difference between these two temperatures is within predetermined allowable limits, a final, stable temperature is predicted and displayed. When the difference falls outside the allowable limits, the temperature prediction computation is repeated after altering the temperature prediction function. An arrangement is possible wherein temperature measurement and the prediction computation are repeated even when the abovementioned difference lies with the allowable limits, with the final temperature being estimated and displayed only when the difference lies within said limits repeatedly a predetermined number of times. Once the predicted, final temperature has been displayed, it is permissible to suspend the computations and maintain the displayed value. Alternatively, however, the temperature measurement and prediction computations can be repeated constantly even after the predicted final value has been displayed, whereby the displayed predicted value may be updated to provide a more accurate value.

In measuring body temperature, the form of temperature change from the start of measurement until the attainment of temperature stabilization differs widely depending upon the thermal characteristics of the clinical thermometer, the state of the region where the temperture is sensed, and the region itself. If the thermal characteristics of the clinical thermometer are limited, however, then the various temperature change patterns can be classified into a number of categories. In other words, placing a limitation upon the thermal characteristics will make it possible to define a number of temperature change patterns. Two major categories of temperature change are those resulting from, say, measurement orally and measurement by placement of the thermometer in an armpit. Although other categories may also be conceived, the following discussion will deal with body temperature measured orally.

It is known from oral measurement of temperature for a wide variety of cases that approximately three to five minutes is required for stabilization of temperature with a thermometer having a given thermal characteristic. Let U* represent the difference between final, stabilized temperature Te and a temperature T during measurement. Upon investigation, it is found that U* is expressed with good accuracy by the following formula at a comparatively early stage of measurement:

$$U^* = Te - T = \alpha t + \beta + C(t+\gamma)^\delta \tag{1}$$

where:
- U*: difference between stable temperature and temperature during measurement
- t: time from beginning of measurement
- C: variable parameter
- α, β, γ, δ: constants in conformance with measurements made under constant conditions.

In particular, for oral measurement of body temperature, the following is found to hold with good regularity, based upon experiments:

$$U^* = -0.001t + 0.05 + C(t+1)^{-1.0} (6 \leq C \leq 26) \tag{2}$$

where t is measured in seconds and U* in degrees Centigrade.

Therefore, an arithmetic expression is set up such that a predicted temperature Tp, namely a temperature obtained by predicting the final, stable temperature Te, will correspond to the sum of the real-time temperature T at the time said stable temperature Te is predicted, and a corrective temperature differential U, which is equivalent to Eq. (2). Accordingly, we will have a first prediction function, given by the following, defining a corrective temperature differential used for predicting temperature:

$$U = Tp - T = -0.001t + 0.05 + C(t+1)^{-1.0} (6 \leq C \leq 26) \tag{3}$$

Figure 2:
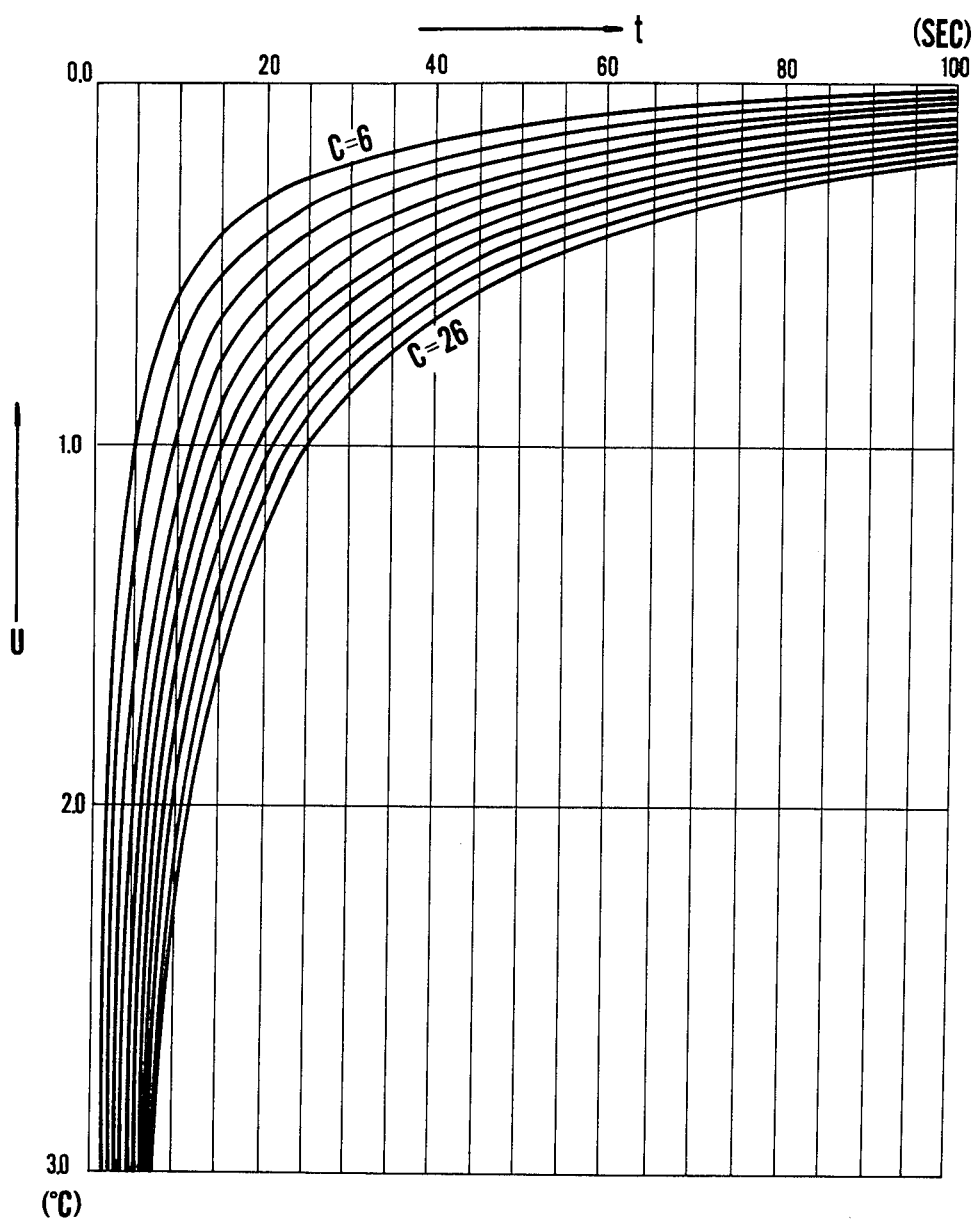
FIG. 2 is a graph indicating change, with time, of a corrective temperature differential U for prediction of final temperature in connection with a variable parameter C=6 to 26, where body temperature is sensed orally.

In Eq. (3), the reason for replacing U* with U is that the final temperature Te upon stabilization corresponds to the predicted temperature Tp as far as execution of the prediction process is concerned. When the value of the parameter C is varied from C=6 to C=26, the curves shown in FIG. 2 are the result. It should be noted that Eq. (3) also holds with good accuracy for temperature sensed rectally.

Figure 3:
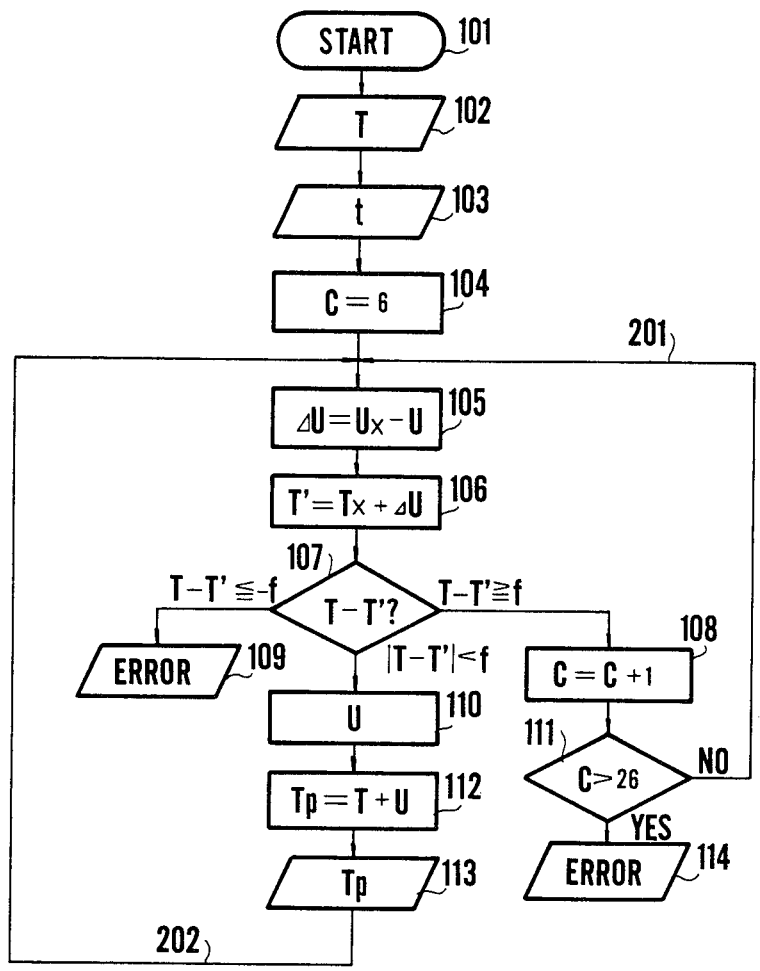
FIG. 3 is a flowchart indicating the operation of the arrangement shown in FIG. 1.

FIG. 3 is a flowchart for an algorithm describing the processing for predicting temperature as carried out by the arrangement illustrated in the block diagram of FIG. 1.

With the start step 101, power is introduced to the system to actuate the temperature measuring unit 1 (FIG. 1), upon which the process moves to a temperature measurement step 102. Next, the arithmetic unit 2 monitors the real-time temperature signal 5 from the temperature measuring unit 1. When measurement start conditions, such a suitable rate of temperature change, are satisfied, the arithmetic unit 2 executes a step 103 for measuring elapsed time and, simultaneously, executes a step 104 for setting a parameter to an initial value for use in a temperature prediction computation process. In step 104, therefore, the parameter C in Eq. (3) is set to a value of six (C=6). Temperature and elapsed time information necessary for subsequent steps are stored within the arithmetic unit 2, with the arrangement being such that the present temperature can be predicted based on the past information. The process for predicting the present temperature comprises a step 105 for computing a temperature increment $_\Delta$U, and an adding step 106. The temperature increment $_\Delta$U is defined by the difference between a measured temperature Tx at an elapsed time $t_x$ just prior to the present time t, and a temperature T' predicted for the present time t. Therefore, we have the following equation which serves as a suitable second prediction function for predicting temperature:

$$\Delta U = U_{x.} - U = -0.001(t_x - t) + C\{(t_x+1)^{-1.0} - (t+1)^{-1.0}\} \quad 6 \leq C \leq 26) \tag{4}$$

$$T = T_x + \Delta U \tag{5}$$

Thus, as a result of the steps through the adding step 106, the arithmetic unit 2, using Eqs. (4) and (5), computes the temperature T' predicted at the present time based on time t which has elapsed up to the present, elapsed time $t_x$ just prior to the present, and the temperature $T_x$ measured at $t_x$. It should be noted again, however, that the parameter C is set to six (C=6) in the initial setting step 104 as the beginning of the computation processing, as mentioned above.

The temperature T' predicted for the present point in time applied as the real-time predicted temperature signal 6 to the evaluating unit 3, whose other input is the real-time temperature signal 9 from the temperature measuring unit 1, which signal represents the temperature T actually being measured at the present time. An evaluating step 107 calls for the evaluating unit 3 to monitor the difference between the temperature T' predicted for the present time and the temperature T being measured at the present time, and to produce the signal 7 which will initiate one of the following processes depending upon the indicated conditions:

(i) a step 108 for increasing the value of the parameter C when T−T' ≧ f holds;

(ii) a step 110 for computing the corrective temperature differential when |T−T'| < f holds, indicating the a prediction error is within allowable limits;

(iii) a step 109 for displaying "ERROR" when T−T' ≦ −f holds. Note that f is a suitably selected evaluation function. Using the following function as f is particularly convenient:

$$f = (t_x+1)^{-1.0} - (t+1)^{-1.0} \tag{6}$$

Figure 4:
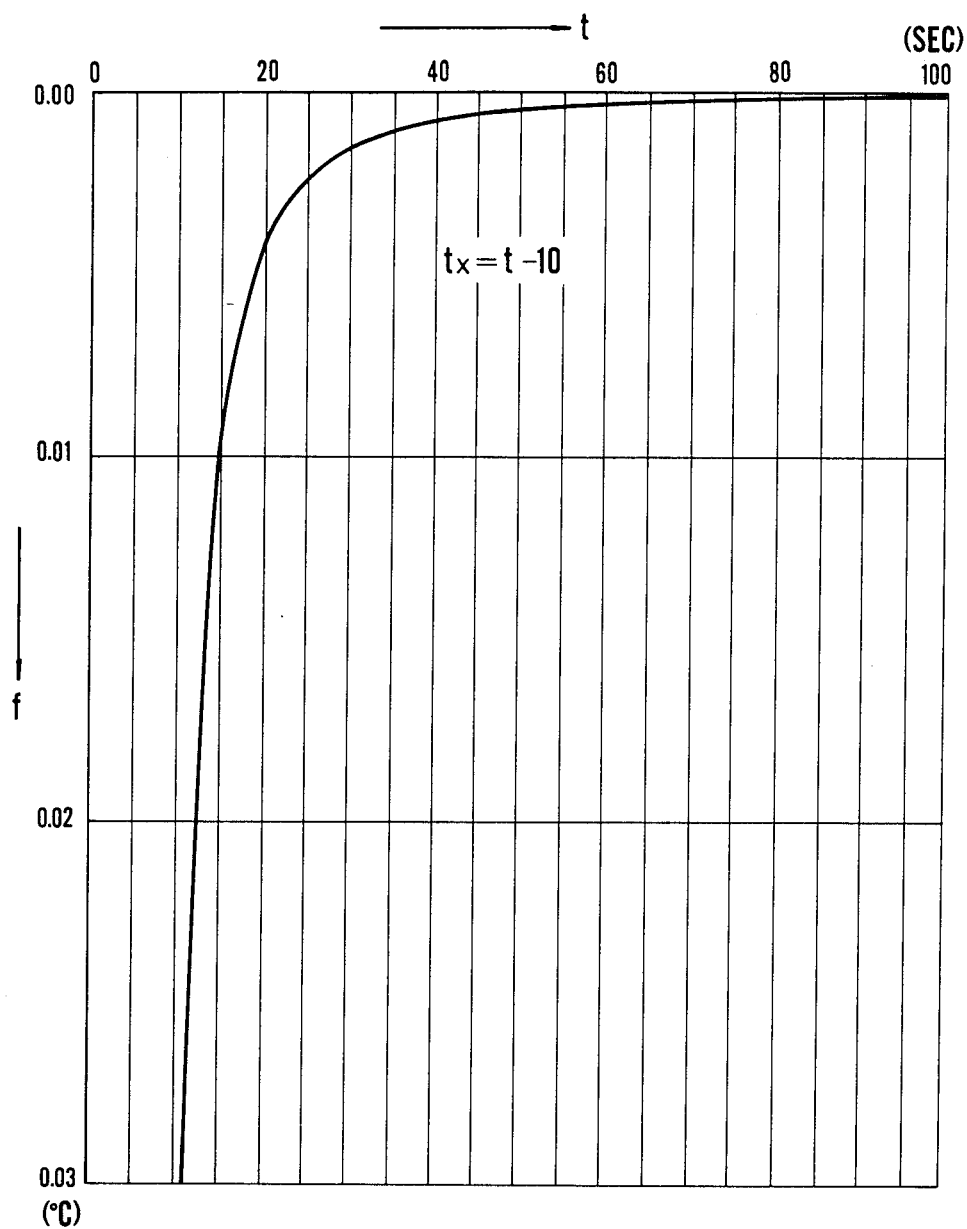
FIG. 4 is a graph indicating an evaluation function f for a case where an instant in time ten seconds prior to the present time t is used as a past time $t_x$.

This is for dealing with situations where a change in predicted value becomes large when the parameter is altered in a case where t is small, and where a change in predicted value becomes increasingly smaller as t grows larger. FIG. 4 shows the change in f for a case where $t_x$ is ten seconds prior to the present time t. In principle, Eq. (6) conforms to the following:

$$f = (U_{x,c=c+1} - U_{c=c+1}) - (U_{x,c=c} - U_{c=c}) \qquad (7)$$

When the step 108 for increasing the parameter C is indicated by the signal 7 in accordance with the evaluation step 107, the arithmetic unit 2 immediately raises the parameter C to C+1 and, upon traversing an upper limit decision step 111 in a loop 201, again executes the temperature increment computation step 105 and the addition step 106, delivering the real-time predicted temperature signal 6 to the evaluating unit 3. The foregoing is repeated until processing enters a loop 202 containing the corrective temperature differential computing step 110. Upon being instructed to perform step 110 by the signal 7, the arithmetic unit 2 computes the corrective temperature differential U and executes an addition step 112 to obtain Tp, the signal 8 indicative of the predicted final temperature being delivered to the display unit 4. The fact that processing has entered the loop 202 signifies that the value of the parameter C in the arithmetic expression (3) is appropriate.

When the result of the decision in step 107 is $T - T' \leq -f$, the signal 107, acting through the arithmetic unit 2, causes the word "ERROR" to appear on the display unit 4. Likewise, when the decision in step 111 regarding the upper limit of the parameter C is C>26, the arithmetic unit 2 causes the display unit 4 to display the word "ERROR". The error display indicates a signficant departure from ordinary measurement conditions.

Thus, according to the present invention, the temperature at the present time is predicted using the prediction arithmetic expression on the basis of past elapsed time and temperature information corresponding thereto, and the predicted value is compared with the actually measured value. The prediction arithmetic expression is then corrected based on the comparison, and the foregoing steps are repeated to pick out the optimum expression. This makes it possible to predict the final, stable temperature correctly.

In the method described hereinabove, the basic concept is to predict the temperature which will prevail at the present time, based on past elapsed time and temperature information corresponding thereto, and compare the predicted value with the actually measured value of the present temperature. This obviously is equivalent to predicting future temperature from time elapsed up to the present and from the corresponding present temperature information, and comparing the predicted future temperature with the temperature actually measured at such time. It should be noted that a fundamental expression giving the difference U* between the final, stable temperature and a temperature during measurement is not limited to Eq. (1).

Essentially, the present invention is directed to predicting final temperature accurately and displaying said temperature prior to stabilization of the measured body temperature. To this end, the temperature at the present time is predicted on the basis of past elapsed time and temperature information corresponding thereto, the predicted value is compared with the value actually measured at the present time, the prediction arithmetic expression is corrected based on the results of the comparison, and these steps are repeated to pick out the optimum prediction expression. Therefore, the invention encompasses all algorithms for implementing the foregoing so long as there is no departure from these fundamentals. For example, in FIG. 3, the steps from 110 for computing the corrective temperature differential U to 113 for displaying Tp, can be situated immediately prior to step 108 for altering the parameter C, or immediately prior to the evalutation step 107. By doing so, a display will be presented even in a case where the parameter C is improper, but the displayed reading will make it possible to observe the rise in temperature. The reason is that the parameter C is initially set to the minimum value of six, i.e., C=6, in step 104. Such an arrangement gives the observer a more natural impression of temperature transition, as the temperature is seen to rise with time.

Figure 5:
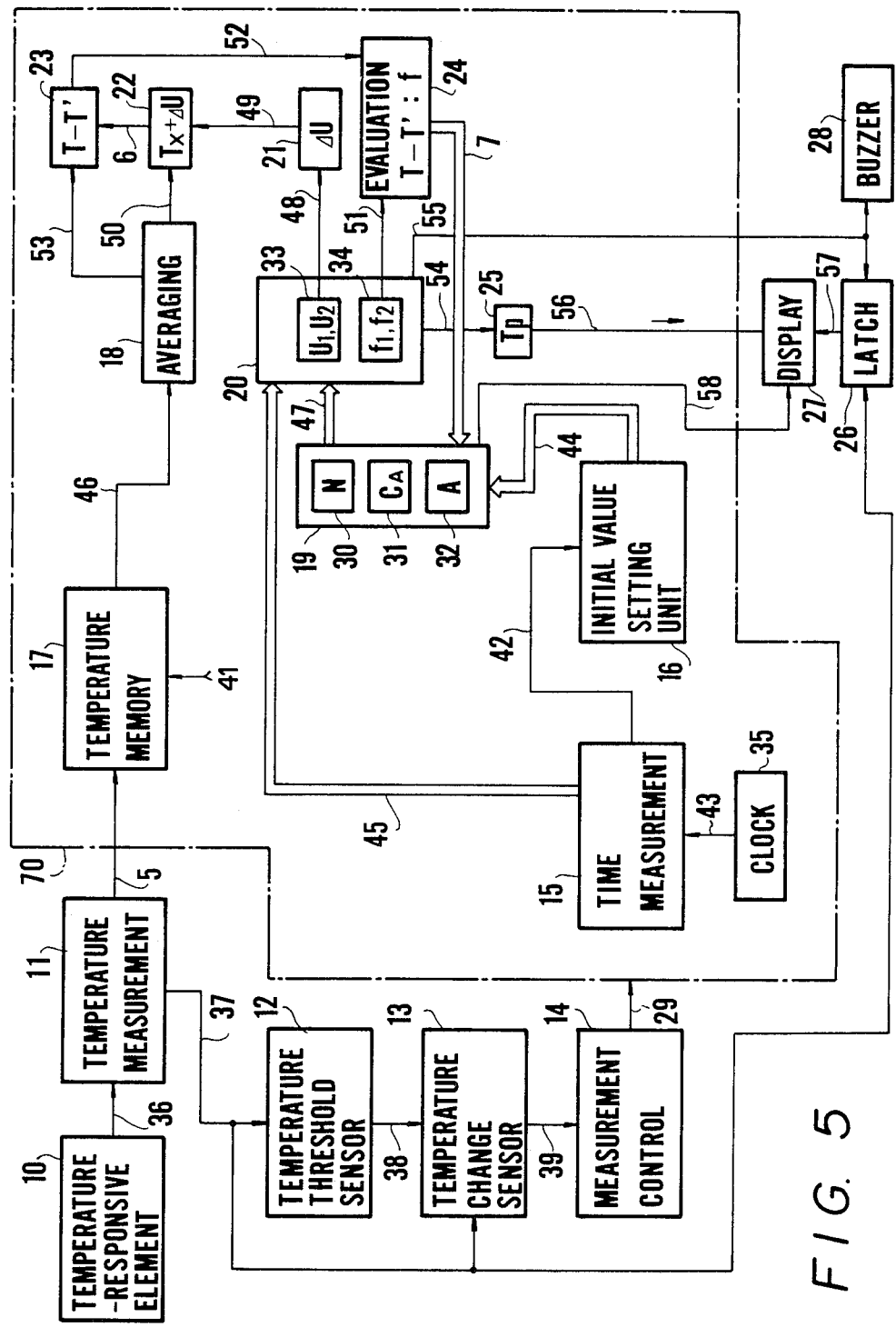
FIG. 5 is a block diagram illustrating an embodiment of an electronic clinical thermometer according to the present invention, which thermometer is capable of predicting final temperature regardless of whether temperature is sensed orally or by placing the thermometer in an armpit.
Figure 6:
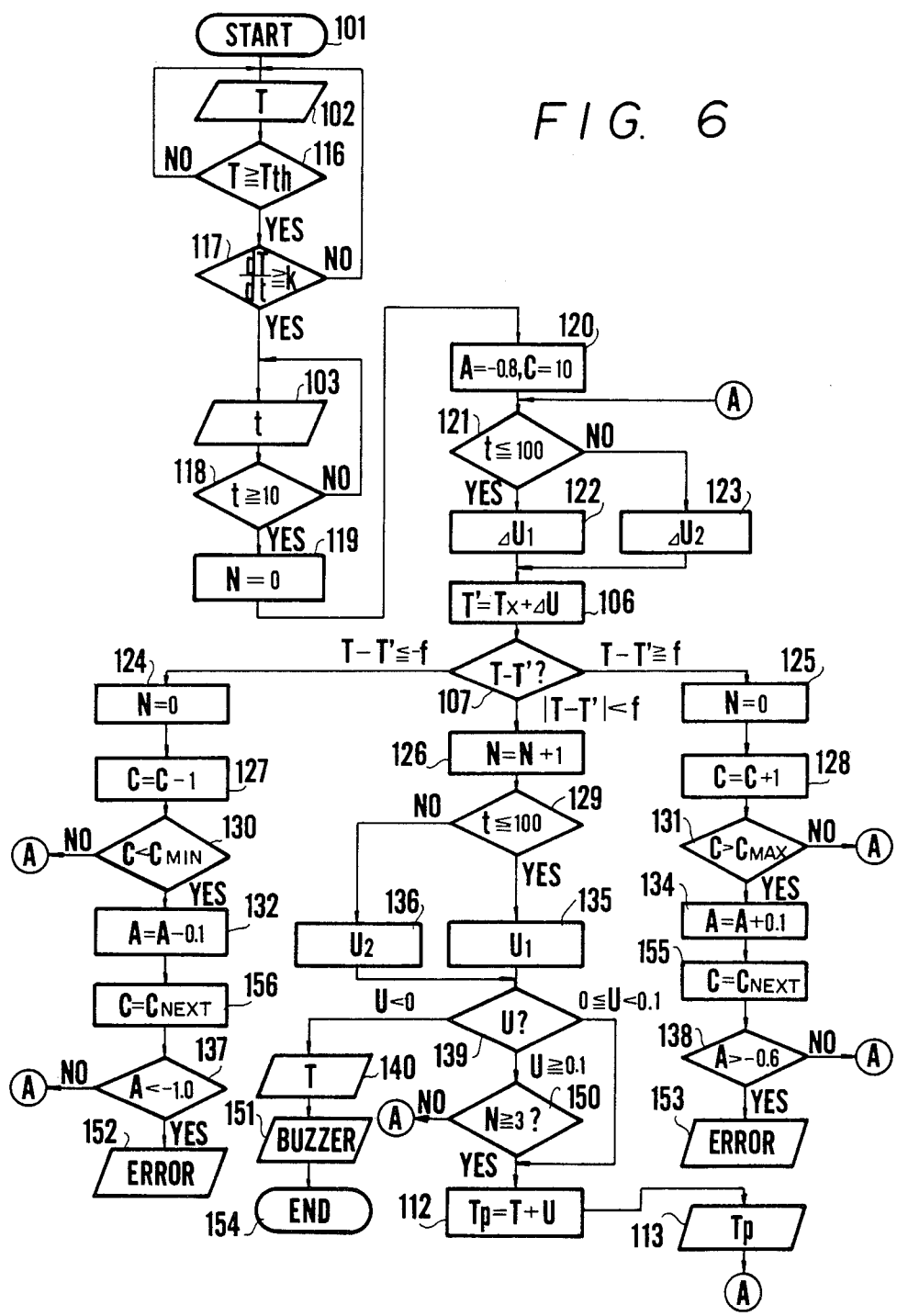
FIG. 6 is a flowchart indicating the operation of the arrangement shown in FIG. 5.

FIGS. 5 and 6 illustrate a block diagram and flowchart, respectively, of an electronic clinical thermometer capable of predicting final temperature regardless of whether temperature is sensed orally or by placing the thermometer in an armpit. From the illustrated embodiment, the detailed construction of the arrangement shown in FIG. 1 will also be readily apparent.

The expression of the corrective temperature differential for temperature sensed orally is as indicated earlier. For sensing body temperature both orally and in an armpit, the first prediction function is given by either of the following, depending upon the decision rendered in step 129 in which 100 seconds serves as a boundary value:

$$U_1 = (-0.0025A - 0.0035)t + 0.5A + 0.55 + C(t+1)^A \qquad (8)$$

where $10 < t \leq 100$), $$U_2 = (-0.0025A - 0.0035)t + 0.5A + 0.55 + C(t+1)^A + 0.02(t-100)/(C+10) \qquad (9)$$

where t>100). In the above, A is a variable parameter. The range over which the parameter C can be varied with respect to A is as shown in the following TABLE I. When A = -1.0, Eq. (8) reduces to Eq. (3). When A = -0.6, Eqs. (8) and (9) give the corrective temperature differential for sensing temperature in an armpit.

TABLE I

| A | $C_{MIN}$ | $C_{MAX}$ |
| --- | --- | --- |
| -0.6 | 2 | 12 |
| -0.7 | 6 | 12 |
| -0.8 | 9 | 11 |
| -0.9 | 8 | 18 |
| -1.0 | 6 | 26 |

With the present state of the art, the hardware arrangement of FIG. 5, which makes use of a microcomputer, is well-suited for realizing an electronic clinical thermometer capable of executing the algorithm described hereinabove. In the arrangement of FIG. 5, a block 70 is realized through use of the central processing unit (CPU), read-only memory (ROM) and random-access memory (RAM) of a general-purpose microcompter. It should be noted that the individual elements constituting the block 70 specify, in the form of included labeled blocks, respective functions implemented by a program stored in the read-only memory (ROM) of the microcomputer. By reading the description given hereinafter, those skilled in the art will be capable of readily understanding the construction and operation of the invention to a degree necessary for working the same.

In the embodiment illustrated in FIG. 5, a temperature-responsive element 10 such as a thermistor is connected to a temperature measurement circuit 11. The latter produces an output 5 connected to a temperature memory 17, and an output 37 connected to a temperature threshold value sensor circuit 12, a temperature change sensor circuit 13, and a latch 26. The temperature threshold value sensor circuit 12 senses whether a real-time temperature signal 37 has exceeded a predetermined threshold value. The circuit 13 senses the rate of change of the real-time temperature signal 37. The latch 26 serves to store the real-time temperature temporarily. A measurement control circuit 14 generates an interrupt input signal 29 applied to the block 70 (for performing the functions of both the arithmetic unit 2 and evaluation unit 3 in FIG. 1), which is composed of the CPU, ROM and RAM of a microcomputer.

The temperature memory 17, which is supplied with a clock signal from an internal clock circuit 35, is a storage device for storing the temperature output 5 of the temperature measurement circuit 11, the temperature data being stored sequentially from oldest to newest. The output 46 of the memory 17 is connected to running average calculating or averaging means 18, namely arithmetic means for computing an arithmetic mean. The latter produces an output 50 applied to adding means 22, the output of which is in turn connected to subtracting means 23. Time measurement circuit 15 responds to the clock signal 43 from the internal clock circuit 35 by measuring elapsed time from the start of temperature measurement, producing an elapsed time signal 45 that is applied to main arithmetic means 20, and a ten-second elapsed time signal 42 that is applied to initial value setting means 16. The latter responds to the ten-second elapsed time signal 42 by delivering an initial setting signal 44 to a main counter register 19.

The main counter register 19 is connected to the main arithmetic means 20 and constitutes a counter for setting and counting the number of times N an optimum loop is traversed, as well as the parameters C and A, as will be described below. The main arithmetic means 20 monitors the elapsed time signal 45 and selects computation and processing operations conforming to the magnitude of the signal 45 in order to compute the corrective temperatuure differential U and evaluation function f. It also monitors the number of traversals N and the corrective temperature differential, and instructs subsequent steps in accordance with the magnitudes thereof to deliver the corrective temperature differential.

The output 48 of the main arithmetic means 20 is connected to temperature increment computing means 21 for computing the temperature increment $_\Delta$U, and to evaluation computing means 24 which, using the evaluation function f from the main arithmetic means 20, evaluates the difference between real-time temperature and the results of predicting the present temperature based on data which prevailed ten seconds earlier. The evaluating means 24 produces the signal 7, which is applied to the main counter register 19. The main arithmetic means 20 also produces a signal 54 connected to adding means 25 for computing a predicted, final temperature Tp, and a signal 56 indicative of said temperature Tp is applied to a display device 27. The latter presents a visual display of the predicted, final temperature Tp, or of the real-time temperature held in the latch 26. A signal 55 from the main arithmetic means 20 is connected to a buzzer 28 which issues an audible tone when measurement of temperature is completed.

A method of measuring body temperature according to the present invention will now be described. In step 101 of FIG. 6, the temperature measuring circuit 11 receives an output 36 from the temperature-responsive element 10 and implements the temperature measurement step 102. The threshold value sensing circuit 12 supplies the temperature change sensing circuit 13 with an ON signal 38 when the real-time temperature signal 37 from the temperature measuring circuit 11 is found to exceed a preset threshold value, such as 30° C., in the threshold value sensing step 116. The temperature change sensing circuit 13 performs the temperature change sensing step 117 on the basis of the real-time temperature signal 37 from the temperature measuring circuit 11, and decides whether the rate of temperature rise is at least 0.1° C. per second. If it is, the temperature change sensing circuit 13 delivers an ON signal 39 to the measurement control circuit 14. The latter responds by applying the interrupt signal 29 to the processor block 70 to initiate an interrupt. The interrupted processor block 70 causes the time measuring means 15 to start accepting the clock signal 43 from the internal clock circuit 35 so that the elapsed time measuring step 103 will be executed.

The time measuring means 15 applies the elapsed time signal 45 to the main arithmetic means 20 and the ten-second elapsed time signal 42 to the initial value setting means 16. When $t \geq 10$ holds in step 118, the initial value setting means 16 performs the initial value setting steps 119, 120. Step 118 is a decision step which calls for waiting a certain period of time until a subsequent temperature prediction step takes on meaning. For example, the system waits in standby for the initial ten seconds until start of a computation for a corrective temperature. The reason is that the accuracy of temperature prediction is extremely poor, and would give unsatisfactory results, for a period of less than ten seconds. The initial value setting means 16, upon receiving the ten-second elapsed time signal 42, applies the initial value setting signal 44 to the main counter register 19, whereby the number of traversals N of an optimum loop (described below) is initially set to 0, parameter A is initially set to $-0.8$, and parameter C is initially set to 10.

Meanwhile, the time measuring means 15 is applying the elapsed time signal 45 to the main arithmetic means 20, which uses the signal 45 along with a parameter signal 47 from the main counter register 19 for performing the operations of Eqs. (8) and (9). The main arithmetic means 20 functions to (a) monitor the elapsed time signal 45 and select computation and processing steps in accordance with the magnitude thereof, (b) compute the corrective temperature differential U and the evaluation function f (these being expressed by blocks 33, 34, respectively), (c) monitor N and the corrective temperature differential, (d) indicate the next step in accordance with the magnitudes thereof, and (e) deliver the corrective temperature differential as an output signal. Computation of the corrective temperature differential entails obtaining two corrective temperature differentials for identical values of the parameters A and C based on elapsed time t and an earlier elapsed time $t_x$, say $t-10$ (i.e., a point ten seconds earlier than t). The difference between these two computed values is equivalent to the second prediction function for obtaining the temperature differential $_\Delta U$, corresponding to Eq. (4). In the illustrated embodiment, we have:

$$\Delta U_1 = U_x - U = (-0.0025A - 0.0035)(t_x - t) + C\{(t_x+1)^4 - (t+1)^4\} \quad (10)$$

for $10 < t \leq 100$, the foregoing being the computation performed in step 122, and $$\Delta U_2 = U_x - U = (-0.0025A - 0.0035)(t_x - t) + C\{(t_x+1)^4 - (t+1)^4\} + 0.02(t_x - t)/(C+10) \quad (11)$$

for $t > 100$, the foregoing being the computation performed in step 123.

The decision steps 121, 129 are preformed by the main arithmetic unit 20 in accordance with the functions thereof described above. It is decided in step 129 whether to move to step 135 or 136 for computing the corrective temperature differential based upon Eq. (8) or (9), respectively. In order that the temperature increment computing means 21 may perform step 122, two values of the temperature differential U in terms of t and $t_x$ are delivered to the computing means 21 as signal 48 at intervals of, say, one second. The flowchart of FIG. 6 illustrates an algorithm for the case where $_\Delta U$ is computed by performing the operations of Eqs. (10) and (11). However, it is also possible to adopt a method wherein U is computed through a subroutine, and $_\Delta U$ is then computed based on the results of the computations for U, as illustrated in the block diagram of FIG. 5.

The temperature output 5 of the temperature measuring circuit 11 is constantly applied to the temperature memory 17. In accordance with a memory instruction signal 41 received from the internal clock circuit 35 e.g., every second, the temperature memory 17 stores, say, 14 items of temperature data, corresponding to 14 seconds of time, in regular order from older data to newer data. As new data is sampled, the most recent data is stored in memory such that the oldest data is discarded. Assume that the four oldest and four newest items of data are delivered from the temperature memory 17 to the running average calculating means 18 as the signal 46 so that means 18 may calculate the arithmetic mean of each data group. The arithmetic means of the first and second data groups are treated, ostensibly, as temperature $T_x$ ten seconds prior, and present temperature T, respectively. The former is applied as signal 50 to the adding means 22 for implementing the adding step 106 in order to calculate the real-time predicted temperature. It should be noted that the values of T, $T_x$ are treated in the form of running averages in order to prevent temporary fluctuation of the calculated results. Such processing is, however, not absolutely essential.

The adding means 22 implements step 106 for adding the output $_\Delta U$ of the temperature increment computing means 21 and the output $T_x$ of the running average calculating means 18, and supplies the subtracting means 23 with the signal 6 indicative of the real-time predicted temperature T'. Upon receiving the output 53, indicative of temperature T, from the running average calculating means 18, the subtracting means 23 subtracts the real-time predicted temperature T' from T and sends the result as the output 52 to the evaluating means 24. The latter, which receives a signal 51 representing the evaluation function (f) from the main arithmetic means 20, uses f to perform step 107, namely to evaluate the difference between the real-time temperature T and the results of predicting the present temperature from the data which prevailed ten seconds earlier. The evaluation function f is represented by the general expression of Eq. (7), but takes on the following forms for the conditions indicated:

$$f_1 = (t_x+1)^4 - (t+1)^4 \quad (12)$$

when $10 < t \leq 100$ holds, and $$f_2 = (t_x+1)^4 - (t+1)^4 + 0.02\{1/(C+11) - 1/(C+10)\}(t_x - t) \quad (13)$$

when $t > 100$ holds.

The results of evaluation may take one of three forms:

(i) $T - T' \leq f$, indicating a step for increasing the value of the parameter C;

(ii) $|T - T'| > f$, indicating execution of the next step, without altering the parameter;

(iii) $T - T' \leq -f$, indicating a step for decreasing the value of the parameter C.

The signal 7 produced by the evaluating means 24 decides which of the foregoing steps is executed.

When processing moves to step 128 for increasing the value of the parameter C, N is first set to zero (N=0) in step 125, after which the current value in the $C_A$ counter register 31 is incremented by one step. At the same time, in decision step 131, C is monitored to detect whether it exceeds the maximum value $C_{MAX}$, in accordance with TABLE I. When $C_{MAX}$ is exceeded, processing advances to step 134, which calls for the current value in the A counter register 32 to be increased by 0.1. In step 155, the value in the counter register 31 is reset in accordance with TABLE I.

Let us describe an example for a case in which an intial setting, performed in step 120, is updated. When the parameter C is found to exceed 11 in step 131, processing moves to step 134 in which 0.1 is added to the parameter A, making A equal to $-0.7$. In the following step 155, the parameter C is set to a new value 6 ($C_{NEXT}$) in accordance with TABLE I.

In decision step 138, the value of A is monitored and, when $A > -0.6$ holds, the main arithmetic means 20 sends the error signal 58 to the display device 27, which responds by displaying "ERROR" or the like. When the decision is "NO" in step 131 or 138, processing automatically returns to step 121 to restart computation.

When the parameter C is found to be less than 9 in step 130, processing moves to step 132 where 0.1 is subtracted from the parameter A, making A equal to $-0.9$. Then, as described above, processing moves to step 156 where the parameter C is set to a new value of 18 ($C_{NEXT}$) in accordance with TABLE I. Next, step 137 calls for a decision as to whether the parameter A is smaller than the lower limit value $-1.0$. If the decision is "NO", processing returns to step 121; if "YES", processing moves to step 152, whereby "ERROR" is displayed.

When processing enters the loop (i.e, the optimum loop) which does not call for the parameters to altered, the N counter register 30 executes step 126, after which processing moves to step 135 or 136 for computing a corrective temperature differential. Since this loop is traversed when the parameters used in the foregoing computations are suited to the real-time temperature change, a step 126 is provided for counting the number of times N this loop is traversed consecutively. The main arithmetic means 20 monitors the results of the calculations for the corrective temperature differential, and executes step 139 to produce signals in response to which processing moves to the following steps, respectively:

(i) a step to end processing when U<0 holds;
(ii) a display step when 0≦U<0.1 holds;
(iii) a decision step, regarding the number of times N the optimum loop is traversed, when U≧0.1 holds.

When the corrective temperature differential U is equal to or greater than 0.1° C., the main arithmetic means 20 produces the signal 54 only when the number N of optimum loop traversals is three or more, as decided in step 150. The purpose here is to confirm the suitability of the predicted temperature. The adding means 25 receives the signal 54 and responds by executing the adding step 112. The decision step 150, reached through the step 126, permits the predicted final temperature to be displayed only when the optimum loop is traversed consecutively three or more times. N will be reset to zero if conditions are such that processing moves to step 124 or step 125 even once. Traversal of step 150 will not be necessary when U<0.1 holds, the corrective temperature differential being suitably small. Accordingly, the algorithm is such that processing moves directly to an adding step 112 when 0≦U<0.1 holds, and directly to a display step 140, to display the real-time temperature T, when U<0 holds. In the latter case, the buzzer 28 is activated in step 151 to inform the operator that the measurement has finished.

The adding means 25 receives the real-time temperature signal and corrective temperature differential, though this is not illustrated in FIG. 5, and responds by computing the predicted final temperature Tp which be attained upon stabilization. The adding means 25 applies the signal 56 indicative of Tp to the display device 27, which would responds by displaying Tp in the display step 113. The signal 55 produced by the main arithmetic means 20 when U<0 holds actuates the latch 26, the latter producing an output 57 so that the display device 27 executes step 140 to display the real-time temperature, after which processing terminates in an END step 154. The signal 55 simultaneously enters the buzzer 28, which responds by emitting an audible tone in accordance with the buzzer step 151.

When it is decided in the decision step 107 that processing is to move to the step for decreasing the value of the parameter C, steps 127, 130, 132, 156, 137 are executed in entirely the same way as the corresponding steps implemented when the value of the parameter C is increased.

In the illustrated embodiment, the arrangement is such that oral sensing of temperature, corresponding to A=−1.0, and armpit sensing of temperature, corresponding to A=−0.6, are discriminated automatically, with the body temperature being predicted in a manner suited to the particular sensing method. The steps for achieving the foregoing are executed by the processor block 70 (microcomputer) enclosed by the broken line in FIG. 5.

Reference will now be had to FIGS. 7 through 11 for a detailed description of the hardware constituting those portions that are not implemented by the microcompute or block 70. As for the correspondence between the components of FIG. 5 and those of FIG. 7, the temperature sensing or responsive element 10 in FIG. 5 corresponds to a thermistor 201 in FIG. 7, and the temperature measurement circuit 11 is equivalent to a converting circuit 202 and counter 207 in FIG. 7. The circuit 12 for sensing the temperature threshold value corresponds to the portion of a decoder 212 having an output terminal T1, and the temperature change sensor circuit 13 to a portion of the decoder 212 having an output terminal T2, a frequency divider 216, and a D-type flip-flop 219.

Figure 9:
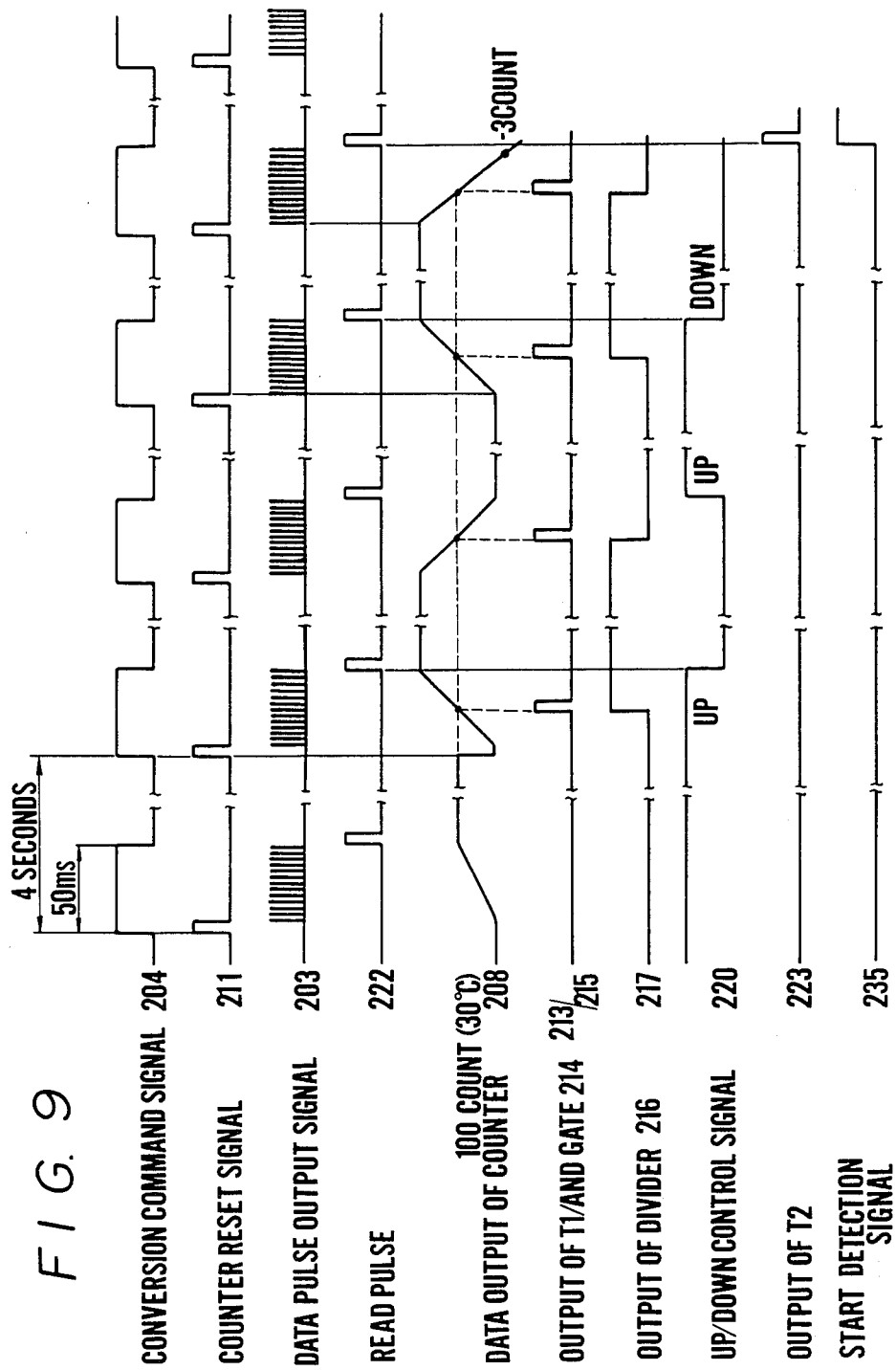
FIG. 9 is a timing chart useful in describing the operation of the arrangement shown in FIG. 7.

The construction of the arrangement shown in FIG. 7 will be described in further detail with reference to the timing chart of FIG. 9. The thermistor 201 for measuring body temperature is connected to the converting circuit 202 for converting resistance into a pulse frequency. The converting circuit 202 receives a reference clock signal 206 and a conversion command signal 204 from a control unit 227. When the command signal 204 from the control unit 227 goes to logical "1", thereby constituting a start signal, the converting circuit 202 begins the conversion operation. Signal 204 is sent to logical "0" by a conversion end signal 205 which the converting circuit 202 delivers to the control unit 227, ending the conversion operation.

Figure 8:
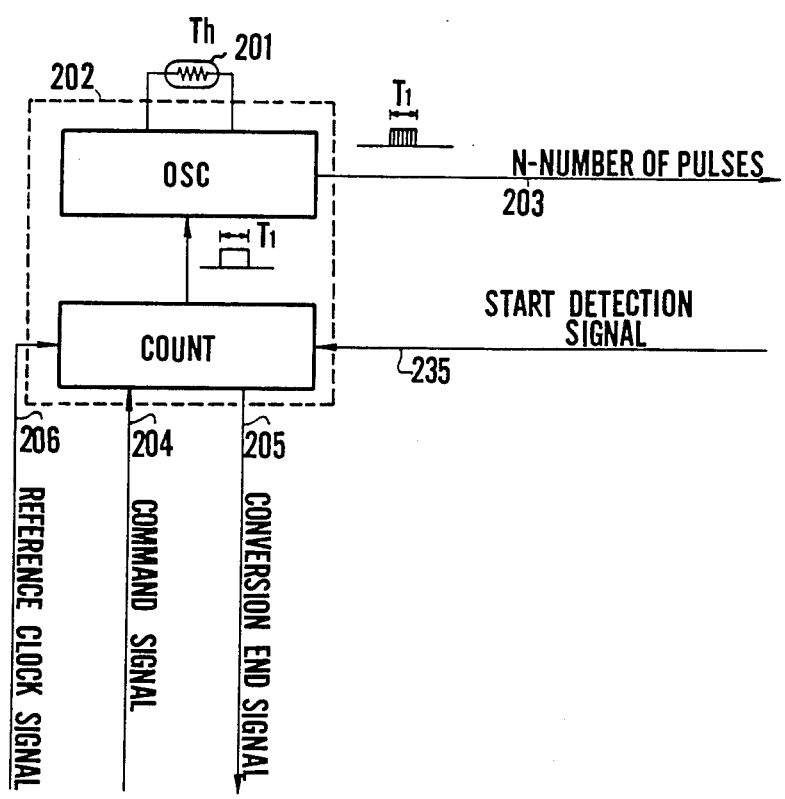
FIG. 8 is a circuit diagram illustrating the construction of a converter, included in the arrangement of FIG. 7, for converting resistance into a number of pulses.

As shown in FIG. 8, the converting circuit 202 includes an oscillator OSC the oscillation frequency whereof varies with the resistance of the thermistor 201, and a counter COUNT for controlling oscillation, and is adapted to deliver pulses 203 which the oscillator produces during a fixed time interval (namely the conversion time of the converting circuit). These pulses constitute the output of the converting circuit 202. The counter COUNT, which controls the time for carrying out the conversion, responds to the conversion command signal 204 by supplying the oscillator OSC with a conversion command of a predetermined duration T1. Upon receiving the signal, the oscillator OSC produces a number of pulses corresponding to the length of time T1. The counter produces the conversion end signal 205 when the conversion time T1 expires. It should be noted that when the counter COUNT receives a measurement start detection signal 235, to be described below, the counter COUNT is set to produce a conversion time longer than T1. These measures of time are produced on the basis of the reference clock signal 206.

Returning to FIG. 7, the abovementioned pulses produced by the converting circuit 202 exit as a data pulse output signal 203. These pulses constitute the clock (CLK) input to a counter 207. The counter 207 is of the reversible counting-type and has an up/down (U/D) terminal for deciding the counting direction. When logical "1" appears at terminal U/D, the counter 207 counts up its clock input. Logical "0" at terminal U/D causes the clock input to be counted down. R denotes the reset terminal of counter 207. The data output 208 (corresponding to the signals 5, 37 in FIG. 5) of counter 207 is applied to the decoder 212 as a data input. The decoder 212 is adapted to produce a logical "1" output on its output terminal T1 upon receiving from counter 207 a data input equivalent to 100 pulses, this occurring when the thermistor 201 senses a temperature of 30° C. This corresponds to step 102 in FIG. 6. A signal appears on output terminal T2 of the decoder 212 when logical "0" is applied to the U/D terminal of counter 207 and the counter counts down to −3, applying this data to the decoder 212. An output signal 213 is obtained from terminal T1. This signal is applied to an AND gate 214 whose other input is a decode control signal 229 from the control unit 227. The decode control signal 229 is produced by a counter 306 (shown in FIG. 10) for enough time so as to enable the AND gate 214 to detect the output T1 of decoder 212 which will be produced by the counter 207 after it starts up/down counting. When the thermistor 201 senses a temperature of 30° C. or more, causing an output to appear on terminal T1 of the decoder 212, and when the decode control signal 229 is logical "1", the output signal 217 of the divide-by-2 frequency divider 216 goes to logical "1". This signal is applied to the data input of the data-type flip-flop 218. The clock input to the flip-flop 218 is a read pulse 222 produced by the control unit 227 in sync with the trailing edge of the conversion command signal 204 in order that the data input may be stored in the flip-flop 218. With the data input to the data-type flip-flop 218 being logical "1", the $\overline{Q}$ output of the flip-flop 218, namely an up/down control signal 220, goes to logical "0". The counter 207, which receives the $\overline{Q}$ output at its U/D terminal, is switched over from the up-count to the down-count mode and begins counting down the pulses 203. In addition, a counter reset signal 211 is gated by an AND gate 219 and not allowed to pass. Accordingly, the data pulse input 203 to the counter 207 resulting from the next conversion command signal 204 will count down the counter from the value of the previous up-count operation.

The final value resulting from the down-count operation will be zero when the previously measured temperature and the temperature just measured are the same. When the latter is higher, however, counter 207 is counted down beyond zero to a negative value. When this value reaches a count of, say, −3 (corresponding to a temperature of +0.3° C.) or a more negative value, an output pulse 223 emerges from terminal T2 of decoder 212 and enters a flip-flop 224 which responds by producing a signal 235 indicating that a meaningfull measurement may begin. This signal is applied to the converting circuit 202, placing it in a body temperature measurement mode and elevating its precision. The signal 235 is also applied to the restart terminal of the microcomputer 231. The AND gate 233 takes the AND between this signal and an interruption-request signal 234 generated every second, whereby the microcomputer 231 is started every second from its interrupt-start address. The foregoing process corresponds to step 117 in FIG. 6.

A measurement start signal 230 produced as an output by the microcomputer 231 every second functions as a sampling command. When the signal enters the control unit 227, the latter produces the conversion command signal 204 whereby the value corresponding to the temperature measured by the thermistor 201 appears as the output data 208 from counter 207. This value is then read in, operated upon, processed in accordance with subsequent step 121 in FIG. 6 and predicted temperature is displayed when it satisfies the requirements for display. At the end of the body temperature measurement, the microcomputer 231 sends a measurement end signal 228 to the control unit 227 to again establish a pre-measurement mode for sensing the start of a measurement. The microcomputer 231 again enters a stand-by state at this time to reduce power consumption. It should be noted that the well-known display device 27 and buzzer 28 are connected to the microcomputer 231 as output means, as illustrated in FIG. 5.

Returning to the state of counter 207, a count of less than −3 (i.e., −2, −1, 0, +1 . . . ) will not cause the decoder 212 to produce the pulse 223. Flip-flop 224 therefore will not change state, and signal 235 will not appear. Since the divide-by-two frequency divider 216 is receiving the decoded output 215 at the start of the down-count operation, the output of the frequency divider again changes state at this time and, in consequence, so does flip-flop 218. The resulting high level of signal 220 places the counter 207 in the up-count mode and, with the arrival of signal 211, in the reset state. This re-establishes the conditions for detection of a temperature of 30° C. or more.

Figure 10:
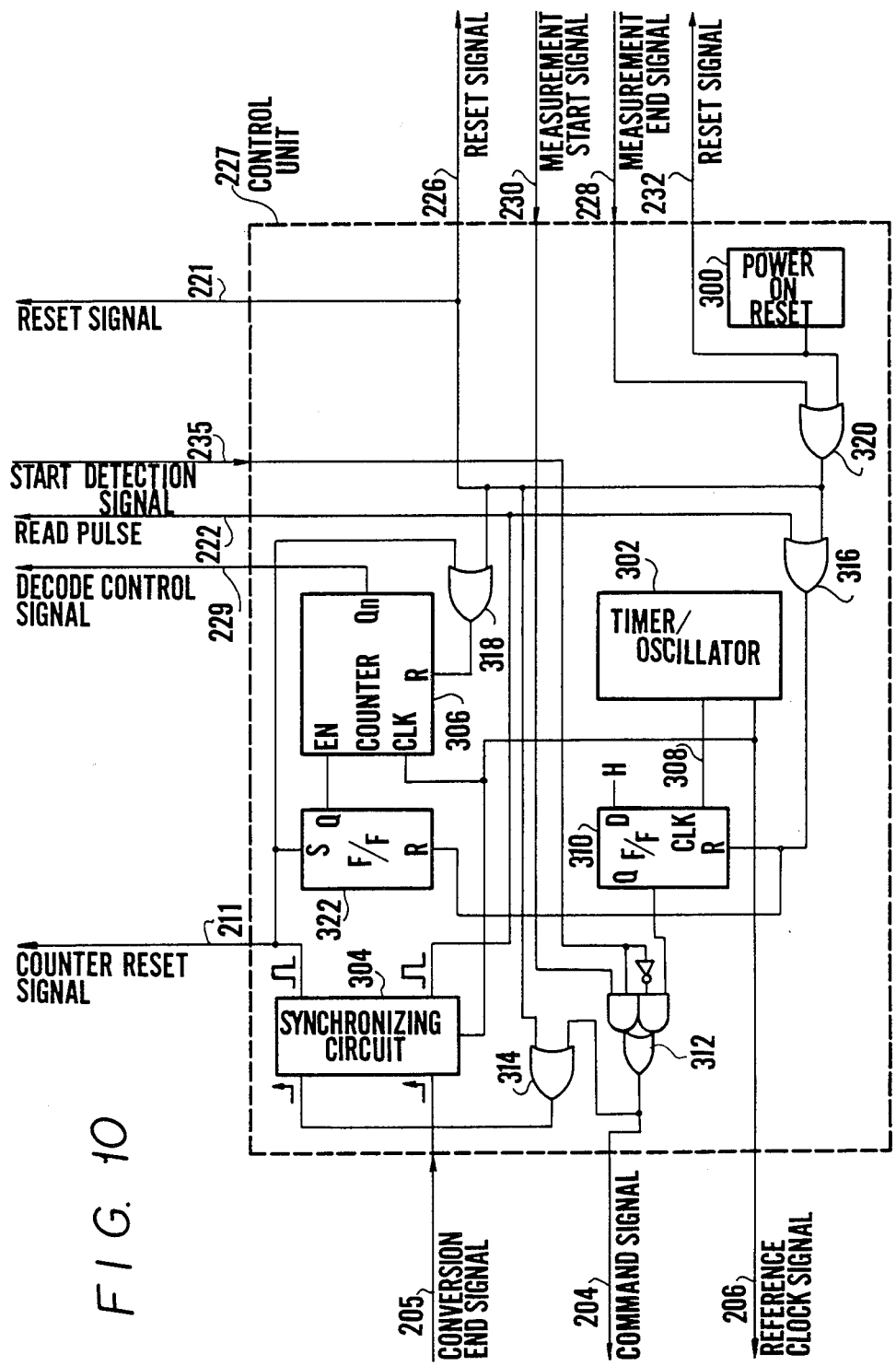
FIG. 10 is a block diagram illustrating the detailed construction of a control unit shown in FIG. 7.

The construction of the control unit 227 is shown in FIG. 10. A power-on reset circuit 300 produces the reset signal 232 when power is introduced to the electronic clinical thermometer of this embodiment from a power supply. Signal 232, as well as being sent to the microcomputer, functions to reset the logic within the control unit 227. A timer/oscillator circuit 302 delivers the reference clock 206 to the converting circuit 202, the clock 206 also being used as a control clock for the logic within the control unit 227. By way of example, the clock 206 is used by a synchronizing circuit 304, comprising a plurality of flip-flops, to produce the pulses 211 synchronized to the clock 206 at the leading edge of its input signal, and is used as a timer counting clock by a counter circuit 306 for producing the decoder control signal 229. The pulse 211 is applied to a flip-flop 322 thereby setting the same and producing the Q output for enabling the counter 306. The counter 306 is reset by the counter reset signal 211, measurement end signal 228 or a power on reset signal via an OR gate 318. The oscillator circuit 302 also produces a clock 308. This serves as a pre-measurement timing clock, set to a period of four seconds, for use in the above mentioned pre-measurement operation of low accuracy. The periods of clocks 206, 308 can be set freely by the microcomputer 231. A pre-measurement flip-flop 310 is triggered by the leading edge of the clock 308 and produces the measurement start signal (command signal) 204 via an OR gate 312. The other input to OR gate 312 is the measurement start detection signal 235 which, similarly, sends the signal 204 to logical "1". An OR gate 314 is provided in order that the reset signal 211 for the counters 207, 306 may be formed in sync with the command signal 204 or reset signal 226. The conversion end signal 205 activates the synchronizing circuit 304 which responds by producing the read pulse 222 and, through an OR gate 316, by resetting corresponding flip-flops 310, 322. Reset signals 221 and 226 are produced by an OR gate 320 in response to the power-on reset signal 232 or the measurement end signal 228 from the microcomputer 231.

Figure 7:
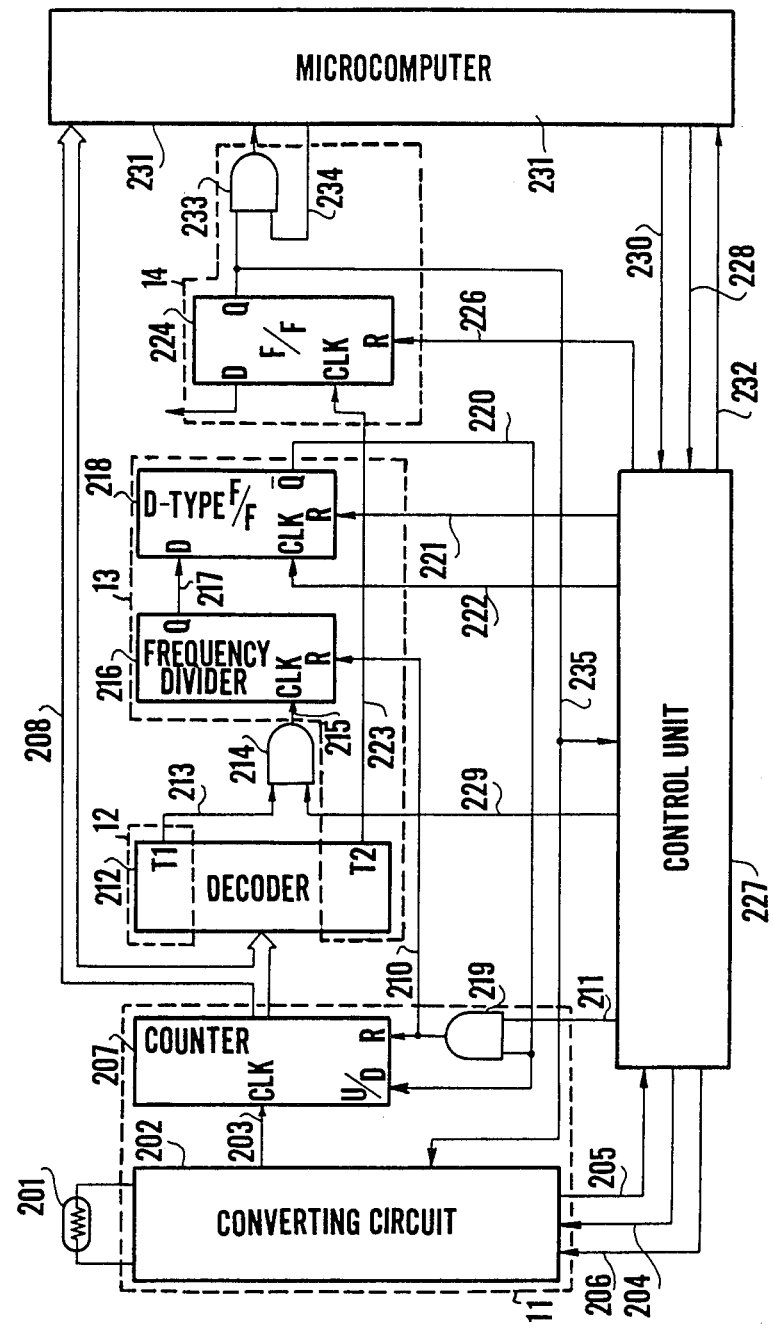
FIG. 7 is a block diagram illustrating the arrangement of FIG. 5 in greater detail.

The circuit shown in FIG. 7 is constructed using C-MOS technology. At the instant power is introduced to the circuitry, the counter reset signal 211 and flip-flop reset signals 221, 226 are produced to reset the counter and flip-flops. The microcomputer 231, on the other hand, receives a reset signal 232 for initialization, upon which the microcomputer is placed in the stand-by state to suppress power consumption.

Figure 11A:
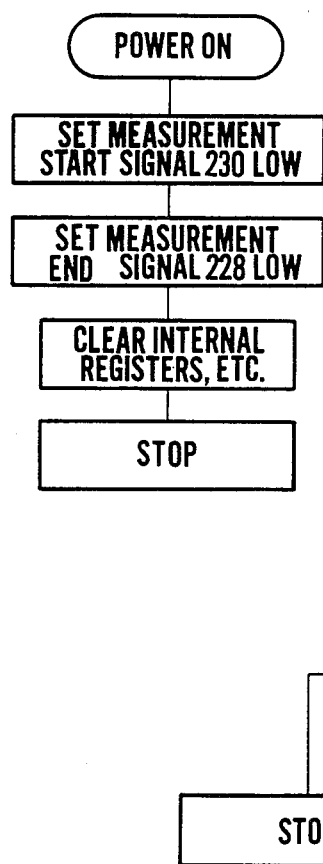
FIGS. 11A, 11B are flowcharts indicating CPU operation and control when power is introduced to a microcomputer shown in FIG. 7.
Figure 11B:
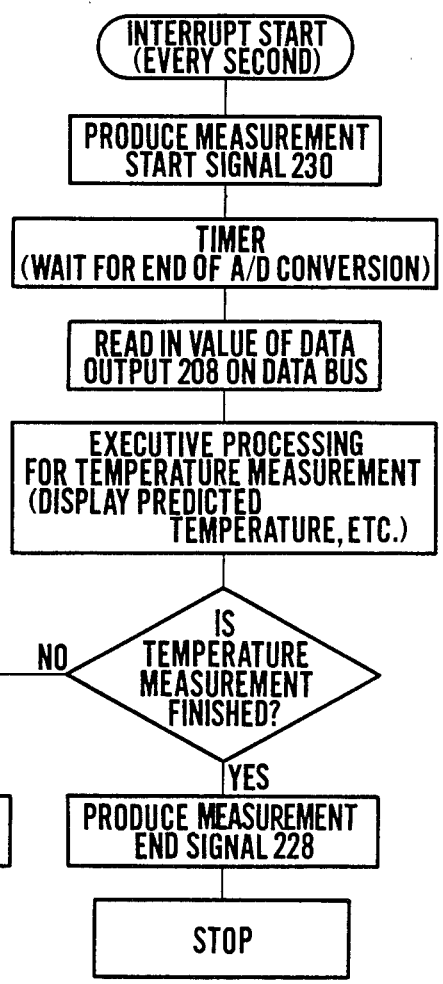

Reference will now be had to FIGS. 11A and 11B to describe processing executed by the microcomputer 231 when power is introduced.

Referring first to FIG. 11A, the measurement start signal 230 is set to a low level when power is introduced. Next, the measurement end signal 228 is set to the low level and the registers are cleared, establishing a halted state awaiting an interrupt.

In FIG. 11B the microcomputer 231 has been started by the interrupt start signal 234 generated every second and produces the measurement start signal 230. Thenceforth the timer is set and the microcomputer awaits for the end of an A/D conversion, i.e, for the conversion of temperature information into digital data. When the time kept by the timer expires, the data output 208 on the data bus is read in, computations and processing are executed on the basis of the data, the predicted temperature is displayed if it is necessary, and so forth. When the body temperature measurement ends, the measurement end signal 228 is produced and the operation of the CPU is suspended.

Further, an arrangement is possible wherein the functions of the temperature threshold value sensor circuit 12, temperature change sensor circuit 13 and measurement control circuit 14 may be performed by a microcomputer having a timer interrupt function. For example, the function performed by the temperature threshold value sensor circuit 12 can be implemented by a processing routine wherein the processor receives the temperature signal 5 from the start step 101 and responds by executing steps 102 and 116 at regular, comparatively short intervals. If a "YES" result is obtained in step 116, step 117 will be executed by the processor. If a timer interrupt function is used conjointly, a timer interrupt routine will be started at intervals of one second when the decision in step 116 is "YES". Control corresponding to the memory instruction signal 41 will be executed whenever the timer interrupt is generated. Thereafter, the one-second timer interrupt will start the processing routine of step 117 for deciding whether the temperature rise per second is 0.1° C. or more, whereby the function of the temperature change sensing circuit 13 is performed. If the decision in step 117 is "YES", the steps 103, 118 are executed for a wait of ten seconds. Here a counting area in a memory (RAM) is initialized to "1", and the number of one-second timer interrupts is counted. When ten seconds elapse, processing moves to a routine for executing steps 119 onward. In the routine for counting the number of timer interrupts, elapsed measurement time is clocked continuously, and the elapsed time signal 45 is applied to the main arithmetic means 20 each time ten seconds elapses, by way of example. Thus, the functions of the time measuring circuit 15 and measurement control circuit 14 can be implemented by a microcomputer.

In accordance with the electronic clinical thermometer and method of temperature measurement of the present invention as described and illustrated hereinabove, the results of predicting temperature based on a selected prediction function are evaluated and, while the evaluation is being carried out, the value of the parameter used for the prediction process, namely the prediction function, is corrected in accordance with the results of the evaluation. This provides a predicted temperature reading of comparatively good accuracy. Further, temperature measurement and the prediction operation continue even when a predicted final temperature has been obtained and, when a decision is rendered to the effect that the final, stable temperature has been attained, the actually measured temperature, namely the final, stable temperature, is displayed. The longer a temperature measurement is performed, therefore, the higher the accuracy of the measurement. Further, according to the invention, different arithmetic expressions for predicting temperature, as well as different parameters contained by these expressions, can be selected at will. This makes it possible to predict final temperature accurately with the same electronic clinical thermometer regardless of whether body temperature is measured, e.g., orally or by placement of the thermometer in an armpit.

As many apparently widely different embodiments of the present invention can be made without departing from the spirit and scope thereof, it is to be understood that the invention is not limited to the specific embodiments thereof except as defined in the appended claims.

What we claim is:

1. An electronic clinical thermometer which comprises:
   means for sensing body temperature at a prescribed part of a body;
   logical arithmetic means for predicting a final, stable temperature based on the sensed body temperature, said arithmetic means storing a plurality of temperature prediction functions in which elapsed measurement time is a variable, each function defining a temperature change up to a final, stable temperature;
   display means for displaying temperature;
   means which clocks elapsed measurement time, and means for controlling said temperature sensing means and said arithmetic means at sampling instants; and
   storage means for temporarily accumulating temperatures sensed by said temperature sensing means at said sampling instants;
   said logical arithmetic means:
   (a) selecting one of the temperature prediction functions;
   (b) reading the accumulated temperatures out of said storage means, comparing a predicted value of temperature for the present sampling instant with a temperature, sensed by said temperature sensing means, associated with the present sampling instant, and obtaining the difference between the predicted value and the sensed temperature on the basis of the comparison, said predicted value being obtained in accordance with the selected temperature prediction function based on a temperature among said read temperatures which is associated with a past sampling instant and elapsed measurement time up to said past sampling instant;
   (c) selecting a new temperature prediction function, and returning to (b) when said difference lies outside prescribed limits; and
   (d) obtaining a predicted value of final, stable temperature corresponding to said selected temperature prediction function, and supplying the obtained value of the final, stable temperature to said display means, when said difference lies within said prescribed limits.

2. The electronic clinical thermometer according to claim 1, wherein said temperature prediction function includes first and second temperature prediction functions, said first temperature prediction function is a function for obtaining a corrective temperature differential representing the difference between temperature sensed by said temperature sensing means and a predicted value of final, stable temperature, said second temperature prediction function is a function for obtaining a temperature increment up to a certain past time, with the temperature sensed by said temperature sensing means serving as a reference, and wherein the second temperature prediction function is selected in (a) and (c), the predicted value of temperature at the present sampling instant is obtained in (b) based on a temperature increment found in accordance with said selected second temperature prediction function, and the predicted value of final, stable temperature is obtained in (d) based on a corrective temperature differential found in accordance with a first temperature prediction function corresponding to said selected second temperature prediction function.

3. The electronic clinical thermometer according to claim 2, wherein $U=\alpha t+\beta+K(t+\gamma)^\delta$ is used as said first temperature prediction function, where:
U: corrective temperature differential
t: elapsed measurement time
K: variable parameter indicating extent of temperature rise
$\alpha, \beta, \gamma, \delta$: constants 4. The electronic clinical thermometer according to claim 2, wherein $U=(aA+b)t+cA+d+K(t+e)^4+f(t-t_o)/(K+g)$ is used as said first temperature prediction function, where:
U: corrective temperature differential
t: elapsed measurement time
A: variable parameter dependent upon part of body where temperature is being sensed
K: variable parameter indicating extent of temperature rise
a, b, c, d, e, f, g: constants
$t_o$: constant indicating prescribed point in time during course of measurement
$(t-t_o)$ being replaced by zero when $t-t_o$ is negative, and by the actual value when $t-t_o$ is non-negative.

5. The electronic clinical thermometer according to claim 2, wherein the second temperature prediction function selected in (a) is a value having the highest probability of being the proper temperature change, obtained statistically by an actual measurement performed in advance with elapsed measurement time.

6. The electronic clinical thermometer according to claim 2, wherein the temperature prediction function selected in (a) is one in which the first temperature prediction function corresponding to said second temperature prediction function approaches a final, stable temperature quickly with elapsed measurement time, and wherein, in (d), second temperature prediction functions corresponding to the first temperature prediction function approaching a final, stable temperature gradually with elapsed measurement time are selected successively.

7. The electronic clinical thermometer according to claim 2, wherein said first and second temperature prediction functions are provided in conformance with measurement conditions for prescribed parts of a body ranging from an armpit to the interior of the mouth, and wherein the second temperature prediction function selected in (a) corresponds to measurement conditions between those for an armpit and those for the interior of the mouth.

8. The electronical clinical thermometer according to claim 1, wherein said logical arithmetic means supplies said display means with said obtained predicted value of final, stable temperature when said difference lies within the prescribed limits continously a predetermined length of time, and returns to (b) when said difference does not lie in said prescribed limits continuously for the predetermined length of time.

9. The electronic clinical thermometer according to claim 1, wherein said control means instructs said logical arithmetic means to begin executing (b) through (d) when said temperature sensing means senses a body temperature above a predetermined value and said sensed body temperature exhibits a rate of increase above a predetermined value.

10. The electronic clinical thermometer according to claim 1, wherein the temperature associated with said past sampling instant in (b) is an arithmetic mean value of temperatures sensed at a series of plural past sampling instants, and the temperature, sensed by said temperature sensing means, associated with said present sampling instant is an arithmetic mean value of temperature sensed by said temperature sensing means at said present sampling instant and a temperature sensed by said temperatue sensing means at least at one past sampling instant nearest said present sampling instant.

11. An electronic clinical thermometer which comprises:
means for sensing body temperature at a prescribed part of a body;
logical arithmetic means for predicting a final, stable temperature based on the sensed body temperature, said arithmetic means storing a plurality of temperature prediction functions in which elapsed measurement time is a variable, each function defining a temperature change up to a final, stable temperature;
display means for displaying temperature;
means which clocks elapsed measurement time, and means for controlling said temperature sensing means and said arithmetic means at sampling instants; and
storage means for temporarily accumulating temperatures sensed by said temperature sensing means at said sampling instants;
said logical arithmetic means:
(a) selecting one of the temperature prediction functions;
(b) reading the accumulated temperatures out of said storage means, comparing a predicted value of temperature for the present sampling instant with a temperature, sensed by said temperature sensing means, associated with the present sampling instant, and obtaining the difference between the predicted value and the sensed temperature on the basis of the comparison, said predicted value being obtained in accordance with the selected temperature prediction function based on a temperature among said read temperatures which is associated with a past sampling instant and elapsed measurment time up to said past sampling instant;
(c) selecting a new temperature prediction function, and returning to (b) when said difference lies outside prescribed limits; and
(d) obtaining a predicted value of final, stable temperature corresponding to said selected temperature prediction function, supplying the obtained value of the final, stable temperature to said display means, and returning to (b) when said difference lies within said prescribed limits.

12. The electronic clinical thermometer according to claim 11, wherein said arithmetic means supplies said display means with said obtained predicted value of final, stable temperature, and a return is effected to (b) when said difference lies within the prescribed limits continously a predetermined length of time, and effects a return to (b) when said difference does not lie in said prescribed limits continuously for the predetermined length of time.

13. A method of measuring body temperature comprising the steps of:

(a) selecting one of a plurality of temperature prediction functions in which elapsed measurement time is a variable, each function prescribing a temperature change up to a final, stable temperature;

(b) clocking elapsed measurement time and reading in body temperature at a specific point in time;

(c) predicting temperature at a future point in time from said read body temperature and the temperature prediction function at said specific point in time;

(d) comparing said predicted temperature and an actually measured temperature at the future point in time for determining a difference between said temperatures;

(e) altering the temperature prediction function by selecting another temperature prediction function when said difference falls outside prescribed limits, and executing said steps (c) and (d); and (f) obtaining and outputting an actual value of final, stable temperature corresponding to said selected temperature prediction function when said difference falls within said prescribed limits.

14. A method of measuring body temperature comprising the steps of:

(a) selecting one of a plurality of temperature prediction functions in which elapsed measurement time is a variable, each function prescribing a temperature change up to a final, stable temperature;

(b) clocking elapsed measurement time and reading in body temperature at a specific point in time;

(c) predicting temperature at a future point in time from said read body temperature and the temperature prediction function at said specific point in time;

(d) comparing said predicted temperature and an actually measured temperature at the future point in time for determining a difference between said temperatures;

(e) altering the temperature prediction function by selecting another temperature prediction function when said difference falls outside prescribed limits, and executing said steps (c) and (d);

(f) repeating said step (c) a given number of times as time progresses when said difference lies within the prescribed limits; and (g) obtaining and outputting a predicted value of final, stable temperature corresponding to said selected temperature prediction function when each difference between predicted temperature and actually measured temperature at specific points in step (c) lies within the prescribed limits.

* * * * *

UNITED STATES PATENT AND TRADEMARK OFFICE
CERTIFICATE OF CORRECTION

PATENT NO. : 4,592,000
DATED : May 27, 1986
INVENTOR(S) : Hideo ISHIZAKA et al

It is certified that error appears in the above-identified patent and that said Letters Patent is hereby corrected as shown below:

Column 15, line 33, after "which" insert --would--.

Signed and Sealed this

Thirteenth Day of January, 1987

Attest:

DONALD J. QUIGG

*Attesting Officer*  *Commissioner of Patents and Trademarks*